US012622843B2

(12) United States Patent
Tang et al.

(10) Patent No.: US 12,622,843 B2
(45) Date of Patent: May 12, 2026

(54) MASSAGER AND CONTROL METHOD THEREOF

(71) Applicant: ZheJiang E-cozy Electronic Technology Co., Ltd., Zhejiang Province (CN)

(72) Inventors: Shousheng Tang, Zhejiang Province (CN); Daojin Tang, Zhejiang Province (CN); Jianshou Chen, Zhejiang Province (CN)

(73) Assignee: ZheJiang E-cozy Electronic Technology Co., Ltd., Zhejiang Province (CN)

( * ) Notice: Subject to any disclaimer, the term of this patent is extended or adjusted under 35 U.S.C. 154(b) by 664 days.

(21) Appl. No.: 18/094,144

(22) Filed: Jan. 6, 2023

(65) Prior Publication Data

US 2024/0122792 A1 Apr. 18, 2024

(30) Foreign Application Priority Data

Oct. 28, 2022 (CN) ........................ 202211333552.5

(51) Int. Cl.
*A61H 23/00* (2006.01)

(52) U.S. Cl.
CPC ....... *A61H 23/00* (2013.01); *A61H 2023/002* (2013.01); *A61H 2201/0207* (2013.01);
(Continued)

(58) Field of Classification Search
CPC .. A61H 23/00; A61H 23/02; A61H 2023/002; A61H 2201/0207;
(Continued)

(56) References Cited

U.S. PATENT DOCUMENTS 9,789,295 B2 * 10/2017 Zhou ...................... A61H 7/002
10,420,693 B2 * 9/2019 Schubert .................. A61H 1/00
(Continued)

FOREIGN PATENT DOCUMENTS

CN 115624468 A * 1/2023 ............. A61H 23/02
KR 102178263 B1 * 11/2020 ............. A61N 1/328

OTHER PUBLICATIONS

Machine translation of written description and claims for CN115624468 via google patents (Year: 2023).*
(Continued)

*Primary Examiner* — Bradley H Philips
*Assistant Examiner* — Tyler A Raubenstraw
(74) *Attorney, Agent, or Firm* — Bay State IP, LLC

(57) ABSTRACT

A massager includes a shell component provided with a contact side plate; a semiconductor refrigeration sheet, wherein the semiconductor refrigeration sheet is provided in the shell component, and the first working surface of the semiconductor refrigeration sheet is attached to the contact side plate; at least two electrode plates, wherein all of the electrode plates are provided on the contact side plate, and the polarities of the at least two electrode plates are opposite. The massager and the control method thereof according to the present disclosure use the semiconductor refrigeration sheet to cool or heat, so that the massager can realize various massage functions of cold compress, hot compress and alternating cold and hot massage, and achieve the effect of dissolving fat particles and discharging the fat particles out of the body. Moreover, an electrode plate is provided to release pulses, so that muscles can exercise passively.

14 Claims, 2 Drawing Sheets

(52) U.S. Cl.
CPC ................ *A61H 2201/0214* (2013.01); *A61H 2201/0242* (2013.01); *A61H 2201/0264* (2013.01); *A61H 2201/0285* (2013.01); *A61H 2201/5082* (2013.01)

(58) Field of Classification Search
CPC .... A61H 2201/0214; A61H 2201/0242; A61H 2201/0285; A61H 2201/5082
See application file for complete search history.

(56) References Cited

U.S. PATENT DOCUMENTS

| | | | | |
|---|---|---|---|---|
| 10,747,323 | B2 * | 8/2020 | Yi | H10N 10/13 |
| 11,287,890 | B2 * | 3/2022 | Yi | G08B 6/00 |
| 11,998,703 | B2 * | 6/2024 | Ibano | H10N 10/00 |
| 12,270,579 | B2 * | 4/2025 | Kota | F25B 21/02 |
| 2008/0115264 | A1 * | 5/2008 | Gamracy | A61H 33/00 4/496 |
| 2008/0287839 | A1 * | 11/2008 | Rosen | A61H 7/001 601/18 |
| 2010/0292746 | A1 * | 11/2010 | Gorham | A61B 18/04 607/3 |
| 2011/0040235 | A1 * | 2/2011 | Castel | A61F 7/00 604/20 |
| 2014/0378555 | A1 * | 12/2014 | Hung | A61N 1/0428 601/21 |
| 2015/0182375 | A1 * | 7/2015 | Binversie | A61F 7/007 601/18 |
| 2015/0305974 | A1 * | 10/2015 | Ehrenreich | A61B 5/6833 601/46 |
| 2016/0086458 | A1 * | 3/2016 | Biggs | A61B 5/6815 340/407.1 |
| 2016/0136385 | A1 * | 5/2016 | Scorcioni | A61B 5/4812 600/26 |
| 2017/0164876 | A1 * | 6/2017 | Hyde | A61B 5/1118 |
| 2017/0181924 | A1 * | 6/2017 | Thorpe | A61H 7/002 |
| 2017/0189227 | A1 * | 7/2017 | Brunson | A61N 1/325 |
| 2017/0252256 | A1 * | 9/2017 | Henshue | E01C 5/16 |
| 2018/0168919 | A1 * | 6/2018 | Fung | A61H 23/02 |
| 2019/0250710 | A1 * | 8/2019 | Yi | A63F 13/28 |
| 2021/0030617 | A1 * | 2/2021 | Penn | A61H 39/04 |
| 2021/0128058 | A1 * | 5/2021 | Habib | A61B 5/024 |
| 2022/0168170 | A1 * | 6/2022 | Bell | A61F 7/007 |
| 2022/0233399 | A1 * | 7/2022 | Wersland | A61H 23/0254 |
| 2022/0304887 | A1 * | 9/2022 | Liu | A61H 9/0057 |
| 2022/0347010 | A1 * | 11/2022 | Kerth | A61N 1/0492 |
| 2022/0362052 | A1 * | 11/2022 | Hart | A61F 7/007 |
| 2022/0362097 | A1 * | 11/2022 | Hart | A61H 23/0254 |
| 2022/0378604 | A1 * | 12/2022 | Lee | H02J 50/10 |
| 2023/0039362 | A1 * | 2/2023 | Park | A61H 23/004 |
| 2023/0074407 | A1 * | 3/2023 | Wersland | A61H 23/02 |

OTHER PUBLICATIONS

Machine translation of written description and claims for KR102178263 via google patents (Year: 2020).*

* cited by examiner

MASSAGER AND CONTROL METHOD THEREOF

CROSS REFERENCE TO RELATED APPLICATION

This application takes priority from and claims the benefit of Chinese Patent Application No. 202211333552.5 filed on Oct. 28, 2022 and Chinese Patent Application No. 202222856744.6 filed on Oct. 28, 2022, the contents of which are incorporated herein by reference.

TECHNICAL FIELD

The present disclosure relates to the technical field of a massager, in particular to a massager and a control method thereof.

BACKGROUND

With the accelerating pace of modern life, people tend to keep the same posture for long hours of work or entertainment, such as reading and writing at their desks, typing, using mobile phones and other electronic devices, so that it is easy to make the muscles of the relevant body parts in the abnormal physiological curvature state for a long time, resulting in fatigue, ache and other symptoms of the muscles of the body parts.

A massager is a device for stimulating massage to local parts of a human body, which provides various simulation functions such as acupuncture, massage, hot compress and massage, so as to achieve the effects of relaxing muscles, soothing nerves, promoting blood circulation and relieving fatigue. However, the massager in the prior art has a single function, which leads to the problem of a low massage effect of the massager.

SUMMARY

The present disclosure discloses a massager and a control method thereof, solving the problem that the massager has a single function and a low massage effect.

The present disclosure discloses a massager, comprising:

- a shell component, wherein the shell component is provided with a contact side plate;
- a semiconductor refrigeration sheet, wherein the semiconductor refrigeration sheet is provided in the shell component, and the first working surface of the semiconductor refrigeration sheet is attached to the contact side plate;
- at least two electrode plates, wherein all of the electrode plates are provided on the contact side plate, and the polarities of the at least two electrode plates are opposite;
- a control device, wherein the control device is electrically connected with the semiconductor refrigeration sheet and all the electrode plates, and the control device is capable of controlling the first working surface of the semiconductor refrigeration sheet to cool or heat and controlling the electrode plates to discharge.

The electrode plate comprises metal sheets, all of the metal sheets are provided on the contact side plate, and the semiconductor refrigeration sheet is attached to at least one of the metal sheets.

The semiconductor refrigeration sheets correspond to the metal sheets one by one, and the semiconductor refrigeration sheets are attached to the corresponding metal sheets.

The shell component is provided with an air inlet and an air outlet, an airflow channel is provided in the shell component, the airflow channel is communicated with the air inlet and the air outlet, the semiconductor refrigeration sheet is provided with a second working surface opposite to the first working surface, and the gas in the airflow channel flows through the second working surface.

The massager further comprises a heat dissipation structure, the heat dissipation structure is provided on the second working surface of the semiconductor refrigeration sheet, and the heat dissipation structure is located in the airflow channel.

The shell component is further provided with a panel opposite to the contact side plate and a side wall between the panel and the contact side plate, the air inlet is located on the panel and/or the side wall, and the air outlet is located on the panel and/or the side wall.

The airflow channels correspond to the semiconductor refrigeration sheets one by one, and the airflow in each airflow channel flows through the second working surface of the corresponding semiconductor refrigeration sheet.

A vortex fan is provided in the airflow channel, and the air intake of the vortex fan faces the semiconductor refrigeration sheet.

The massager further comprises temperature detection mechanisms corresponding to the metal sheets one by one, the temperature detection mechanisms are capable of detecting the temperature of the corresponding metal sheets, and the temperature detection mechanisms are electrically connected with the corresponding semiconductor refrigeration sheets.

The side of the metal sheet facing the semiconductor refrigeration sheet is provided with a groove, the temperature detection mechanism comprises a thermistor, and the pin of the thermistor is provided in the groove through a thermal conductive film.

The massager further comprises at least two massage parts, each of the massage parts is provided with at least one semiconductor refrigeration sheet and at least one electrode plate, and a distance adjusting mechanism is provided between two adjacent massage parts.

A display screen is provided on the panel, the display screen is electrically connected with the control device; and/or, a control button is provided on the panel, and the control button is electrically connected with the control device.

Another aspect of the present disclosure provides a control method of the massager described above, wherein the massager is provided with a dual-temperature massage mode, and the control method further comprises:

- when the massager is in the dual-temperature massage mode, controlling a semiconductor refrigeration sheet to alternately cool and heat, and controlling an electrode plate to generate pulses.

Controlling the semiconductor refrigeration sheet to alternately cool and heat comprises:

- S1, controlling the semiconductor refrigeration sheet to cool for a first time period;
- S2, controlling the semiconductor refrigeration sheet to heat for a second time period;
- S3, repeating the steps S1 and S2.

The massager comprises at least two semiconductor refrigeration sheets, and the control method comprises:

- when the massager is in the dual-temperature massage mode, heating by at least one of the semiconductor refrigeration sheets while cooling by at least one of the semiconductor refrigeration sheets.

The massager is further provided with a single-cooling massage mode, and the control method comprises:

when the massager is in the single-cooling massage mode, controlling the semiconductor refrigeration sheet to cool, and controlling the electrode plate to generate pulses.

Controlling the semiconductor refrigeration sheet to cool further comprises:

performing cyclic refrigeration in a first preset temperature range by the semiconductor refrigeration sheet.

The massager is further provided with a single-heating massage mode, and the control method comprises:

when the massager is in the single-heating massage mode, controlling the semiconductor refrigeration sheet to heat, and controlling the electrode plate to generate pulses.

Controlling the semiconductor refrigeration sheet to heat further comprises:

performing cyclic refrigeration in a second preset temperature range by the semiconductor refrigeration sheet.

The electrode plate is provided with at least two pulse modes, and controlling the electrode plate to generate pulses further comprises:

controlling the electrode plate to switch freely in the at least two pulse modes.

The massager and the control method thereof according to the present disclosure use the semiconductor refrigeration sheet to cool or heat, so that the massager can realize various massage functions of cold compress, hot compress and alternating cold and hot massage, and achieve the effect of dissolving fat particles and discharging the fat particles out of the body. Moreover, an electrode plate is provided to release pulses, so that muscles can exercise passively, so as to achieve the purposes of exercising muscles and accelerating fat discharge, and effectively improve the massage fat-losing effect of the massager.

Figure 1:
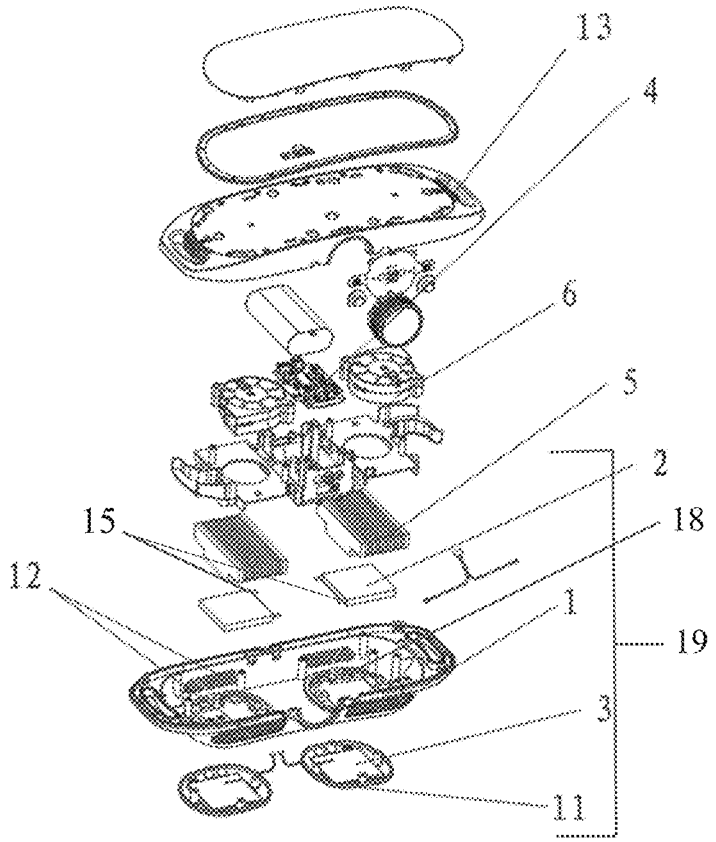
FIG. 1 is an exploded view of a massager according to an embodiment of the present disclosure.

In the figures: 1. Shell component; 11. Contact side plate; 2. Semiconductor refrigeration sheet; 3. Electrode plate; 4. Control device; 12. Air inlet; 13. Air outlet; 5. Heat dissipation structure; 6. Vortex fan.

DETAILED DESCRIPTION OF THE EMBODIMENTS

The present disclosure will be further explained with reference to the embodiments hereinafter, which is not limited to the description.

As shown in FIG. 1 to FIG. 4, the present disclosure discloses a massager, comprising: a shell component 1, wherein the shell component 1 is provided with a contact side plate 11; a semiconductor refrigeration sheet 2, wherein the semiconductor refrigeration sheet 2 is provided in the shell component 1, and the first working surface of the semiconductor refrigeration sheet 2 is attached to the contact side plate 11; at least two electrode plates 3, wherein all of the electrode plates 3 are provided on the contact side plate 11, and the polarities of the at least two electrode plates 3 are opposite; a control device 4, wherein the control device 4 is electrically connected with the semiconductor refrigeration sheet 2 and all the electrode plates 3, and the control device 4 is capable of controlling the first working surface of the semiconductor refrigeration sheet 2 to cool or heat and controlling the electrode plates 3 to discharge. The semiconductor refrigeration sheet 2 is used to cool or heat, so that the massager can realize various massage functions of cold compress, hot compress and alternating cold and hot massage, and achieve the effect of dissolving fat particles and discharging the fat particles out of the body. Moreover, an electrode plate is 3 provided to release pulses, so that muscles can exercise passively, so as to achieve the purposes of exercising muscles and accelerating fat discharge, and effectively improve the massage fat-losing effect of the massager.

When using the massager, a user can place the massager at the position to be massaged and enable the contact side plate 11 to be in contact with the skin of the user. As the first working surface of the semiconductor refrigeration sheet 2 is attached to the contact side plate 11, the temperature change on the first working surface of the semiconductor refrigeration sheet 2 can be directly transmitted to the contact side plate 11 at this time, thus realizing cold compress and/or hot compress of the part to be massaged. Meanwhile, the electrode plate 3 can generate electrical stimulation to the part to be massaged, thus increasing the massage fat-losing effect of the part to be massaged. At the same time, the massage mode of the massager is selected according to the needs, which specifically comprises: controlling the semiconductor refrigeration sheet 2 to cool for cold compress; controlling the semiconductor refrigeration sheet 2 to heat for hot compress; controlling the semiconductor refrigeration sheet 2 to switch between cooling and heating to realize alternate cold and hot massage. In the process of cold compress and/or hot compress, electrical stimulation is accompanied, so that muscles can exercise passively, so as to achieve the purposes of exercising muscles and accelerating fat discharge.

Specifically, the electrode plate 3 comprises metal sheets, all of the metal sheets are provided on the contact side plate 11, and the semiconductor refrigeration sheet 2 is attached to at least one of the metal sheets. As the metal sheets are provided on the contact side plate 11, the metal sheets can be in direct contact with the part to be massaged. At this time, the metal sheet can directly transmit the temperature change generated by the semiconductor refrigeration sheet 2 to the part to be massaged. At the same time, the metal sheet can receive pulse stimulation and directly transmit the pulse stimulation to the part to be massaged, so that the part to be massaged can be massaged by both temperature change and electric stimulation.

The metal sheet is made of metal materials with thermal and electrical conductivity, such as one or more of iron, copper, aluminum, zinc and other materials.

Preferably, the semiconductor refrigeration sheets 2 correspond to the metal sheets one by one, and the semiconductor refrigeration sheets 2 are attached to the corresponding metal sheets. A plurality of semiconductor refrigeration sheets 2 are provided, so that the massager can perform cold compress or hot compress at different positions of the part to be massaged, thereby further improving the massage fat-losing effect. Each of the semiconductor refrigeration sheets 2 can independently cool or heat. Each metal sheet can transfer the temperature change of the corresponding semiconductor refrigeration sheet 2 to the part to be massaged, thus effectively improving the massage fat-losing effect of the massager.

In order to ensure the reliable operation of the semiconductor refrigeration sheet 2, the shell component 1 is provided with an air inlet 12 and an air outlet 13, an airflow channel is provided in the shell component 1, the airflow channel is communicated with the air inlet 12 and the air outlet 13, the semiconductor refrigeration sheet 2 is provided with a second working surface opposite to the first working surface, and the gas in the airflow channel flows through the second working surface. The airflow channel is used to take away the cooling capacity or heating capacity generated by the second working surface (non-working surface) of the semiconductor refrigeration sheet 2, thus ensuring the reliable operation of the first working surface of the semiconductor refrigeration sheet 2.

Preferably, the massager further comprises a heat dissipation structure 5, the heat dissipation structure 5 is provided on the second working surface of the semiconductor refrigeration sheet 2, and the heat dissipation structure 5 is located in the airflow channel.

Specifically, the heat dissipation structure 5 comprises fins, the fins are provided on the second working surface in parallel, and the airflow in the airflow channel can flow through the fins, so that the cooling capacity or heating capacity on the fins can be taken away. Especially when the first working surface of the semiconductor refrigeration sheet 2 is cooled, the heat capacity generated by the second working surface needs to be taken away in time, so as to prevent the internal temperature of the shell component 1 from rising and affecting the use effect of the massager.

The shell component 1 is further provided with a panel opposite to the contact side plate 11 and a side wall between the panel and the contact side plate 11, the air inlet 12 is located on the panel and/or the side wall, and the air outlet 13 is located on the panel and/or the side wall. That is, the problem that the comfort of the user is reduced due to the fact that the airflow from the air outlet 13 of the shell component 1 blows to the user is avoided.

The airflow channels 18 correspond to the semiconductor refrigeration sheets 2 one by one, and the airflow in each airflow channel 18 flows through the second working surface of the corresponding semiconductor refrigeration sheet 2. Each airflow channel 18 dissipates heat for the corresponding semiconductor refrigeration sheet 2, which avoids the temperature interference of the semiconductor refrigeration sheets 2 in different modes and ensures the reliability of the massager.

Specifically, a vortex fan 6 is provided in the airflow channel, and the air intake of the vortex fan 6 faces the semiconductor refrigeration sheet 2.

The massager further comprises temperature detection mechanisms corresponding to the metal sheets one by one, the temperature detection mechanisms are capable of detecting the temperature of the corresponding metal sheets, and the temperature detection mechanisms are electrically connected with the corresponding semiconductor refrigeration sheets 2. The temperature detection mechanism is used to acquire the temperature of the metal sheet, and the working state and the working efficiency of the corresponding semiconductor refrigeration sheet 2 can be controlled according to the acquired temperature, so that each semiconductor refrigeration sheet 2 can work according to the preset working flow in the massager, thereby avoiding the adverse consequences due to the fact that the temperature of the metal sheet exceeds the set range and ensuring the reliable operation of the massager.

As an embodiment, the side of the metal sheet facing the semiconductor refrigeration sheet 2 is provided with a groove, the temperature detection mechanism comprises a thermistor (15), and the pin of the thermistor (16*a*)is provided in the groove (16*b*) through a thermal conductive film (17). The thermal conductive film (17) is used to improve the induction precision of the thermistor and the massage effect of the massager.

The massager further comprises at least two massage parts 19, each of the massage parts 19 is provided with at least one semiconductor refrigeration sheet 2 and at least one electrode plate 3, and a distance adjusting mechanism is provided between two adjacent massage parts 19. Each massage part 19 can correspond to a part to be massaged, and the electrode plates 3 of two adjacent massage parts can be connected to form a loop, thus ensuring the reliable operation of the massager.

The distance adjusting mechanism can be in the form of a buckle and a connecting rope or a buckle and a slide rail, and the distance between two adjacent massage parts 19 can be adjusted by adjusting the position of the buckle, thus increasing the massage range of the massager.

A display screen is provided on the panel, and the display screen is electrically connected with the control device 4. The user can input a control instruction to the massager on the display screen. The control device 4 can receive the control instruction to control the semiconductor refrigeration sheet 2 and/or the electrode plate 3 to switch to the corresponding working state. The display screen can also display parameters such as the working hours of the current massager, which is convenient for the user to observe and control.

A control button is provided on the panel, and the control button is electrically connected with the control device 4. The user can input a control instruction to the massager through the control button. The control device 4 can control the semiconductor refrigeration sheet 2 and/or the electrode plate 3 to switch to the corresponding working state according to the control instruction.

Preferably, each semiconductor refrigeration sheet 2 corresponds to a control button. The control button can control the corresponding semiconductor refrigeration sheet 2 to cool or heat.

As shown in FIG. 1, there are two massage parts 19 in the figure. Each massage part is provided with a semiconductor refrigeration sheet 2 and an electrode plate 3. Each semiconductor refrigeration sheet 2 is correspondingly provided with an airflow channel and a cooling fan.

The massager is further provided with a power supply. The power supply can be a preset battery in the shell component 1 or a power interface provided on the shell component 1. The power supply can be connected with external direct current or other power supply devices through the power interface.

The massager further comprises a knob key. The knob key is electrically connected with the electrode plate 3 and can adjust the pulse intensity of the electrode plate.

Figure 2:
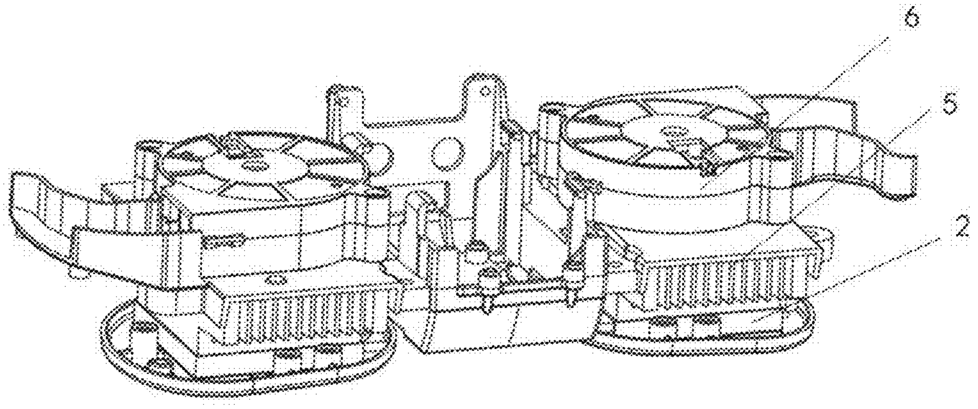
FIG. 2 is a partial schematic diagram of a massager according to the embodiment of the present disclosure.
Figure 3:
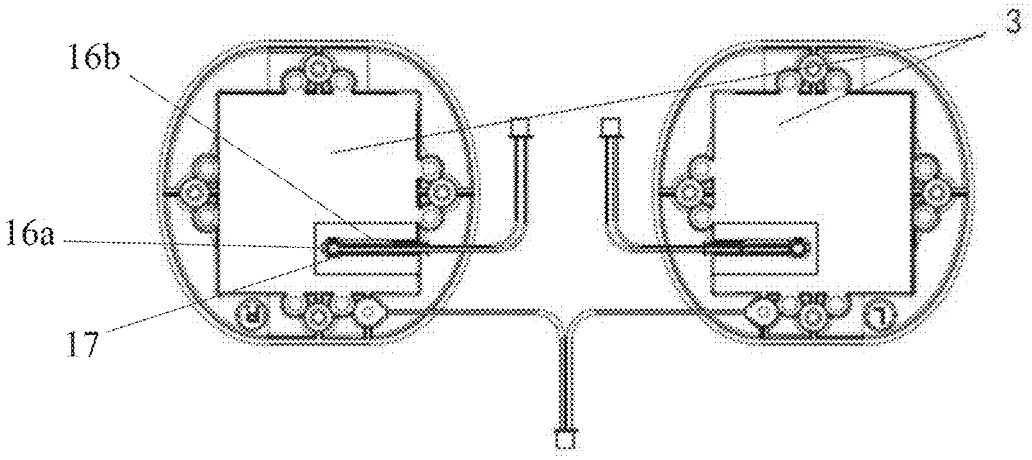
FIG. 3 is a schematic structural diagram of an electrode plate of a massager according to an embodiment of the present disclosure.
Figure 4:
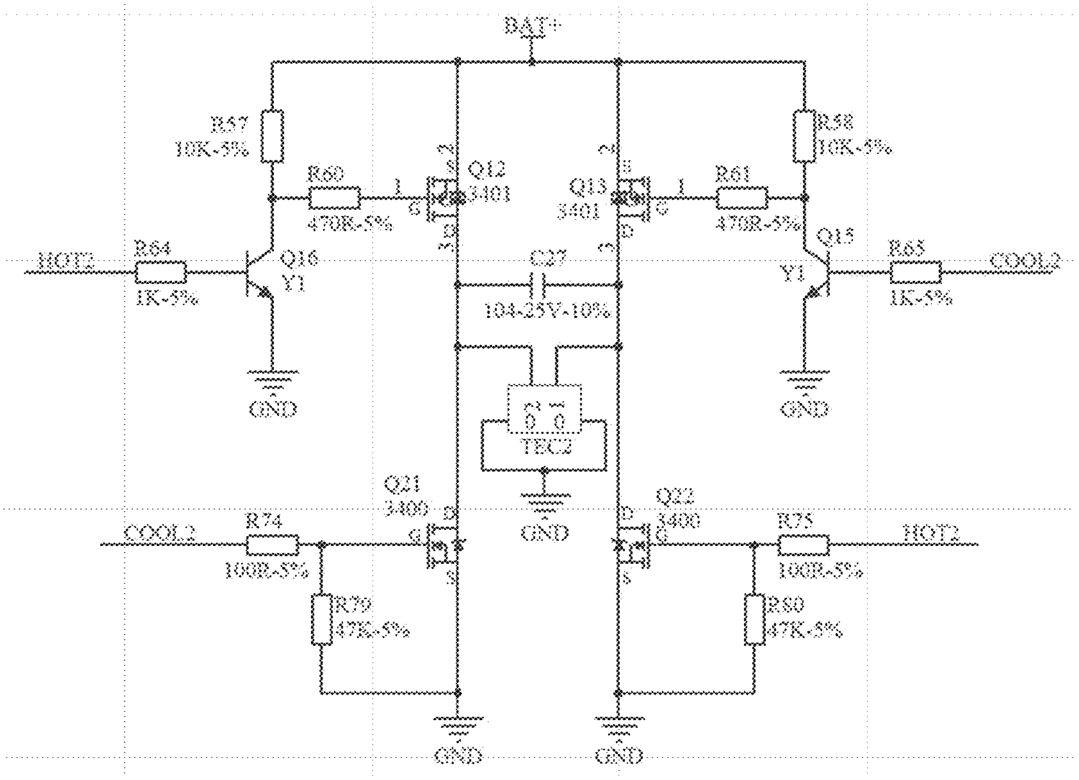
FIG. 4 is a circuit diagram of a control device according to an embodiment of the present disclosure.

As shown in FIG. 2, the circuit principle of the control device 4 of the massager is shown. When HOT2 outputs a high level and COOL2 outputs a low level, the current direction of TEC2 is from left to right. At this time, the semiconductor refrigeration sheet 2TEC2 heats. When HOT2 outputs a low level and COOL2 outputs a high level, the current direction of TEC2 is from right to left. At this time, the semiconductor refrigeration sheet 2TEC2 cools.

Another aspect of the present disclosure provides a control method of the massager described above, wherein the massager is provided with a dual-temperature massage mode, and the control method further comprises:

when the massager is in the dual-temperature massage mode, controlling the semiconductor refrigeration sheet 2 to alternately cool and heat, and controlling the electrode plate 3 to generate pulses.

Controlling the semiconductor refrigeration sheet 2 to alternately cool and heat comprises:

S1, controlling the semiconductor refrigeration sheet 2 to cool for a first time period;

S2, controlling the semiconductor refrigeration sheet 2 to heat for a second time period;

S3, repeating the steps S1 and S2.

The sum of the first time period and the second time period constitutes a massage cycle of the massager. Each time the massager runs, at least one massage cycle can be performed, thereby realizing the purpose of dual-temperature massage.

Specifically, the duration range of the first time period and the second time period is from 5 minutes to 20 minutes. The first time period and the second time period may be the same or different.

The massager comprises at least two semiconductor refrigeration sheets 2, and the control method comprises:

when the massager is in the dual-temperature massage mode, heating by at least one of the semiconductor refrigeration sheets 2 while cooling by at least one of the semiconductor refrigeration sheets 2.

When the semiconductor refrigeration sheet 2 cools, cyclic refrigeration can be performed in the first preset temperature range. When the semiconductor refrigeration sheet 2 heats, cyclic heating can be performed within the second preset temperature range.

The massager is further provided with a single-cooling massage mode, and the control method comprises:

when the massager is in the single-cooling massage mode, controlling the semiconductor refrigeration sheet 2 to cool, and controlling the electrode plate 3 to generate pulses.

Controlling the semiconductor refrigeration sheet 2 to cool further comprises:

performing cyclic refrigeration in the first preset temperature range by the semiconductor refrigeration sheet 2. The first preset temperature range is from 5° C. to 20° C.

The massager is further provided with a single-heating massage mode, and the control method comprises:

when the massager is in the single-heating massage mode, controlling the semiconductor refrigeration sheet 2 to heat, and controlling the electrode plate 3 to generate pulses.

Controlling the semiconductor refrigeration sheet 2 to heat further comprises:

performing cyclic refrigeration in a second preset temperature range by the semiconductor refrigeration sheet 2. The second preset temperature range is from 30° C. to 42° C.

The electrode plate 3 is provided with at least two pulse modes, and controlling the electrode plate 3 to generate pulses further comprises:

controlling the electrode plate 3 to switch freely in the at least two pulse modes.

Specifically, the electrode plate 3 uses muscle electric pulse stimulation (EMS). The electrode plate 3 is provided with four modes, and the pulse frequency of the electrode plate 3 in each mode is different.

The pulse intensity of the electrode plate 3 is provided with a plurality of gears (preferably 20). The electrode plate 3 can switch among a plurality of pulse intensities when working.

Obviously, the above-mentioned embodiments of the present disclosure are only examples to clearly illustrate the present disclosure, rather than limit the embodiments of the present disclosure. For those skilled in the art, other changes or variations in different forms can be made on the basis of the above description. It is impossible to exhaust all the embodiments here. Any obvious changes or variations that are derived from the technical solution of the present disclosure still fall within the scope of protection of the present disclosure.

What is claimed is:

1. A massager, comprising:

a shell component (1), wherein the shell component (1) is provided with a contact side plate (11);

semiconductor refrigeration sheets (2), wherein the semiconductor refrigeration sheets (2) are provided in the shell component (1), and a first working surface of the semiconductor refrigeration sheets (2) is attached to the contact side plate (11);

at least two electrode plates (3), wherein all of the electrode plates (3) are provided on the contact side plate (11), and the polarities of the at least two electrode plates (3) are opposite; and a control device (4), wherein the control device (4) is electrically connected with the semiconductor refrigeration sheets (2) and all the electrode plates (3), and the control device (4) is capable of controlling the first working surface of the semiconductor refrigeration sheets (2) to cool or heat and controlling the electrode plates (3) to discharge;

wherein the electrode plate (3) comprises metal sheets, all of the metal sheets are provided on the contact side plate (11), and the semiconductor refrigeration sheets (2) are attached to at least one of the metal sheets;

wherein the semiconductor refrigeration sheets (2) correspond to the metal sheets one by one, and the semiconductor refrigeration sheets (2) are attached to the corresponding metal sheets;

wherein the massager further comprises temperature detection mechanisms corresponding to the metal sheets one by one, the temperature detection mechanisms are capable of detecting the temperature of the corresponding metal sheets, and the temperature detection mechanisms are electrically connected with the corresponding semiconductor refrigeration sheets (2); and wherein the side of the metal sheet facing the semiconductor refrigeration sheets (2) is provided with a groove, the temperature detection mechanism comprises a thermistor, and the pin of the thermistor is provided in the groove through a thermal conductive film.

2. The massager according to claim 1, wherein the shell component (1) is provided with an air inlet (12) and an air outlet (13), an airflow channel is provided in the shell component (1), the airflow channel is communicated with the air inlet (12) and the air outlet (13), the semiconductor refrigeration sheets (2) are provided with a second working surface opposite to the first working surface, and the gas in the airflow channel flows through the second working surface.

3. The massager according to claim 2, wherein the massager further comprises a heat dissipation structure (5), the heat dissipation structure (5) is provided on the second working surface of the semiconductor refrigeration sheet (2), and the heat dissipation structure (5) is located in the airflow channel.

4. The massager according to claim 2, wherein the airflow channels correspond to the semiconductor refrigeration sheets (2) one by one, and the airflow in each airflow channel flows through the second working surface of the corresponding semiconductor refrigeration sheet (2).

5. The massager according to claim 2, wherein a vortex fan (6) is provided in the airflow channel, and the air intake of the vortex fan (6) faces the semiconductor refrigeration sheets (2).

6. The massager according to claim 1, wherein the massager further comprises at least two massage parts, each of the massage parts is provided with at least one semiconductor refrigeration sheet (2) and at least one electrode plate (3), and a distance adjusting mechanism is provided between two adjacent massage parts.

7. A control method of the massager according to claim 1, wherein the massager is provided with a dual-temperature massage mode, and the control method further comprises:

when the massager is in the dual-temperature massage mode, controlling a semiconductor refrigeration sheet (2) to alternately cool and heat, and controlling an electrode plate (3) to generate pulses.

8. The control method according to claim 7, wherein controlling the semiconductor refrigeration sheet (2) to alternately cool and heat comprises:

S1, controlling the semiconductor refrigeration sheet (2) to cool for a first time period;

S2, controlling the semiconductor refrigeration sheet (2) to heat for a second time period;

S3, repeating the steps S1 and S2.

9. The control method according to claim 7, wherein the massager comprises at least two semiconductor refrigeration sheets (2), and the control method comprises:

when the massager is in the dual-temperature massage mode, heating by at least one of the semiconductor refrigeration sheets (2) while cooling by at least one of the semiconductor refrigeration sheets (2).

10. The control method according to claim 7, wherein the massager is further provided with a single-cooling massage mode, and the control method comprises:

when the massager is in the single-cooling massage mode, controlling the semiconductor refrigeration sheet (2) to cool, and controlling the electrode plate (3) to generate pulses.

11. The control method according to claim 10, wherein controlling the semiconductor refrigeration sheet (2) to cool further comprises:

performing cyclic refrigeration in a first preset temperature range by the semiconductor refrigeration sheet (2).

12. The control method according to claim 7, wherein the massager is further provided with a single-heating massage mode, and the control method comprises:

when the massager is in the single-heating massage mode, controlling the semiconductor refrigeration sheet (2) to heat, and controlling the electrode plate (3) to generate pulses.

13. The control method according to claim 12, wherein controlling the semiconductor refrigeration sheet (2) to heat further comprises:

performing cyclic refrigeration in a second preset temperature range by the semiconductor refrigeration sheet (2).

14. The control method according to claim 7, wherein the electrode plate (3) is provided with at least two pulse modes, and controlling the electrode plate (3) to generate pulses further comprises:

controlling the electrode plate (3) to switch freely in the at least two pulse modes.

* * * * *